United States Patent [19]

Dhoore et al.

[11] 4,155,221

[45] May 22, 1979

[54] TURBOFAN ENGINE HAVING VARIABLE GEOMETRY FAN DUCT

[75] Inventors: Louis G. Dhoore, Seattle; William H. Schultz, Bellevue, both of Wash.

[73] Assignee: The Boeing Company, Seattle, Wash.

[21] Appl. No.: 754,140

[22] Filed: Dec. 27, 1976

[51] Int. Cl.² .............................................. F02K 3/06
[52] U.S. Cl. .................................. 60/226 R; 60/269; 415/119; 415/145
[58] Field of Search ............... 60/226 A, 226 R, 262, 60/269; 415/108, 119, 144, 145

[56] References Cited

U.S. PATENT DOCUMENTS

| | | | |
|---|---|---|---|
| 3,611,724 | 10/1971 | Kutney | 60/226 R |
| 3,756,026 | 9/1973 | Timms et al. | 60/226 R |

*Primary Examiner*—Robert E. Garrett
*Attorney, Agent, or Firm*—Al Richardson; B. A. Donahue

[57] ABSTRACT

This invention is an improved turbofan engine having a variable geometry fan duct which reduces stator source noise emitted from the engine. Attached to the inner wall of the fan casing near the fan stators is a pneumatically actuated annular membrane having two operating positions. In the cruise position, the membrane is forced radially inward to press against the radially outermost tips of the fan stators. In the second position, used during approach and takeoff, the membrane is drawn against a recessed portion in the fan casing, thereby creating an annular passageway between the stator tips and the casing. When the membrane is in this position, turbulent flow from the rotor blade tips which would normally impinge on the stators is directed through the annular passageway.

9 Claims, 4 Drawing Figures

TURBOFAN ENGINE HAVING VARIABLE GEOMETRY FAN DUCT

BACKGROUND OF THE INVENTION

This invention relates generally to gas turbine engines of the turbofan type and more specifically to a device for reducing stator source noise from the fan stage of such an engine.

In the recent efforts to reduce the noise emitted from modern high bypass ratio turbofan engines, considerable attention has been given to the fan sections. Two primary noise sources in these fan sections are known to be the fan rotor and the fan stators. In the effort to reduce the noise generated by these components, it has been necessary to first attempt to find the relative importance of the rotor and second, to attempt to understand the mechanisms by which the noise is generated.

Currently rotor and stator noise emissions are controlled principally through the use of acoustic linings in the engine nacelle, but these linings merely reduce the noise after it is generated rather than act upon the various sources of the noise. The only design technique presently employed to reduce the sources of rotor and stator noise is the choosing of the correct blade/vane ratio for minimizing blade passage tones at subsonic tip speeds.

Numerous contemporary investigations have been conducted to establish the relative importance of rotor and stator noise sources and to understand the various mechanisms by which the noise is generated. Improved experimental techniques have been developed which better simulate the conditions under which an engine operates in actual flight. Test data has indicated that noise from the rotor is dominating in the area in front of the engine, or the forward arc, whereas in the area after the engine, both rotor and stator noise are of equal significance. Recent tests have indicated, however, that stator noise is far more important in the forward arc than was previously believed. These tests have shown that when the fan is operating at subsonic relative tip speeds such as would occur during a landing approach, stator noise contributes significantly to the total noise in both the forward and aft arcs.

Stator noise is generally attributed to rotor-induced unsteady velocities interacting with the stator vanes. The major sources of these unsteady velocities are the wakes from the rotor blades and the secondary flows from the rotor tips and hub regions. Much effort has been expended to analyzing the effect of rotor wakes on the stators, but relatively little effort has been made in investigating the effect of rotor tip flows on them. A recent study has suggested that secondary flows originating from the rotor blade tips may be of greater significance than the remainder of the blade wakes.

Accordingly, it is an object of this invention to provide for an improved turbofan engine wherein a significant portion of the rotor tip flow bypasses the fan stators. It is also an object of this invention to provide for improved fan section for a turbofan engine having reduced stator source noise which can be adapted to present engines with minimal modifications. It is a further object of this invention to provide for an improved turbofan engine having reduced stator source noise during approach and takeoff conditions without affecting engine cruise performance. Another object of this invention is to provide for an improved turbofan engine in which a flexible membrane is disposed within the fan duct near the fan stators to vary the internal geometry of the duct.

It should be noted that the use of a flexible membrane to modify the internal geometry of certain sections of the fan duct of a turbofan engine has been suggested by others. For example, in U.S. Pat. No. 3,967,443, issued on July 6, 1976, to Davis Roberts McMurtry, the patentee discloses the use of a flexible flow area varying member attached to the centerbody near the fan duct exit for varying the nozzle area of the duct. He also suggests the use of a fluid pressure means for changing the shape of the member.

Also, in U.S. Pat. No. 3,611,724, issued on Oct. 12, 1971, to John P. Kutney, a sound suppression means for gas turbine power plant is described in which an inflatable diaphram is positioned within the inlet of the fan duct attached to either the fan casing or shroud. When the diaphram is inflated, the inlet area is reduced, choking the flow and, according to the claims of the inventor, substantially eliminating the propagation of forward arc noise from the fan rotor.

SUMMARY OF THE INVENTION

In summary, this invention can be most broadly described as a new turbofan engine which includes a core engine, a centerbody which encloses the core engine, a fan rotor which is attached to the forward end of the core engine, a fan casing which surrounds the rotor and forms an annular bypass duct between the centerbody and itself, a row of fan stators located downstream of the rotor which are attached to the centerbody and extend radially outward from it, and a flexible membrane attached to the casing and proximate the fan stators. The invention further provides for a fluid pressure means for varying the shape of the membrane so as to create an annular passageway between the inner wall of the fan casing and the radially outermost tips of the fan stators through which the rotor tip flow may pass.

DESCRIPTION OF THE PREFERRED EMBODIMENTS

In discussing the preferred embodiments of this invention it should be understood that the term "fan casing" is used herein in a general sense to describe the enclosure surrounding the entire fan section of a turbofan engine which forms an annular duct around the core engine and centerbody for the passage of air through the engine. The term is intended to encompass other structural elements which commonly form a part of the internal flow surface of the duct, such as the inlet and the fan shroud. The term "centerbody" is used in a general sense to describe the enclosure surrounding the core engine, or that part of the engine in which combustion occurs. This term is intended to include portions of the engine such as the spinner, the rotor hub and the splitter. In this disclosure the terms "upstream" and "downstream" refer to directions parallel to normal airflow entering the engine. The axial direction is assumed to be a direction parallel to the axis of rotation of the rotor, and the radial direction is assumed to be perpendicular to that axis.

Figure 1:
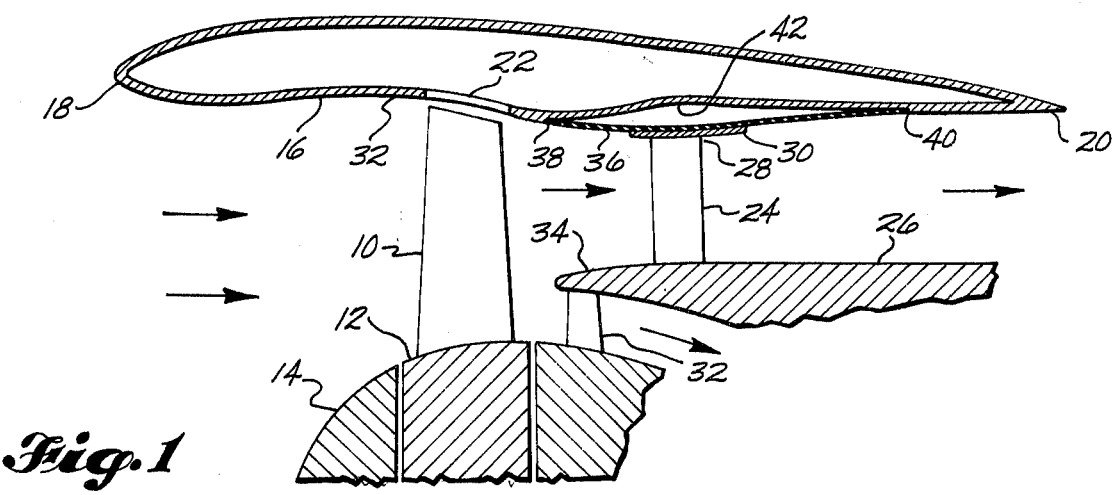
FIG. 1 shows a sectional view of the forward portion and particularly the fan stage of the new engine having a single rotor, a single set of fan stators and a flexible membrane in the cruise position.

FIG. 1 shows a cross section of a forward portion of a typical high bypass ratio turbofan engine including the fan stage. The engine has a single rotor 10 attached to a rotor hub 12 which is rotably mounted on an axially oriented rotor shaft (not shown). The forward end of the centerbody is formed by spinner 14. The rotor is enclosed by fan casing 16 which is generally cylindrical in shape and extends from the inlet lip 18 to the fan bypass nozzle 20. The rotor is also surrounded by an annular fan shroud 22 which is considered to be an integral part of the fan casing. The engine also has a single set of fan stators 24, each blade of which is mounted to splitter 26 and extends radially outward therefrom. The stator blades are attached at their outmost tips 28 to a substantially cylindrical shroud 30 which completely surrounds the stator row.

When the engine is in operation, airflow enters the engine from the left as indicated by the arrows and passes through rotor 10. After being compressed by the rotor the flow is divided into two portions by splitter 26. Flow passing radially inward of the splitter, referred to as primary or core flow, passes through a set of compressor stators 32 and into the engine core (not shown). The remaining portion of the flow, called bypass flow, passes radially outward of the splitter and enters the fan bypass duct which is formed between the inner wall 32 of the engine casing and the outer wall 34 of the splitter portion of the centerbody.

A flexible membrane 36 is attached to the fan casing near the fan stators at its forward end 38 and aft end 40 as shown. The membrane is preferably annular in shape and extends completely around the fan casing. Behind the membrane is located a smoothly contoured recess 42 in the casing for receiving the membrane in one of its two operating positions. When the membrane is flexed during operation, its axial length between points 38 and 40 will not change substantially; but its circumference will vary especially toward the middle. The circumference will remain unchanged at ends 38 and 40 but will vary at other points on the membrane. Accordingly, the membrane may be constructed of a material which is substantially inelastic in the axial direction but relatively flexible in the circumferential direction.

Materials with elastic properties which vary in direction are well known in the art. For example, one type of material which would exhibit these characteristics has a rubber sheet reinforced with steel tape or other fibers running in the axial direction. It may also be desirable to vary the degree of circumferential flexibility of the membrane to control its contour when it is flexed. One way to accomplish this is to embed hoops of reinforcing material in it at various axial positions.

Figure 2:
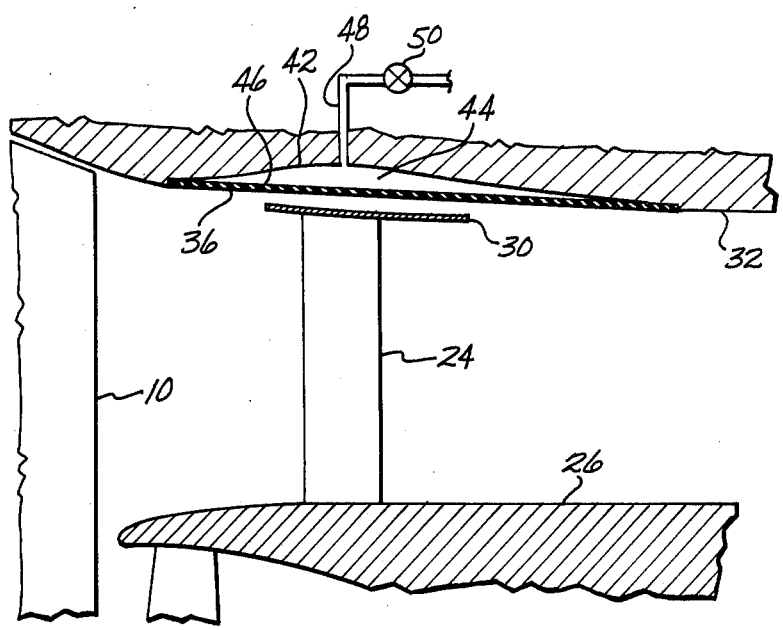
FIG. 2 shows a more detailed view of FIG. 1 in the region of the fan stators.

FIG. 2 shows a more detailed view of the fan section of the engine of FIG. 1 in the region of the fan stators. In this view the membrane is shown as it would be normally positioned when the engine is not in operation. Also shown in this view are fluid pressure means which can be used to vary the shape of the membrane when the engine is in operation. The membrane may be expanded or contracted by varying the fluid pressure within cavity 44 between inner surface 46 of the membrane and contoured recess 42. Pressure is transmitted to the cavity by line 48 and controlled by valve 50. Obviously, line 48 can be connected to a variety of pressure sources such as the outside atmosphere, the engine pneumatic system or a vacuum source.

Figure 3:
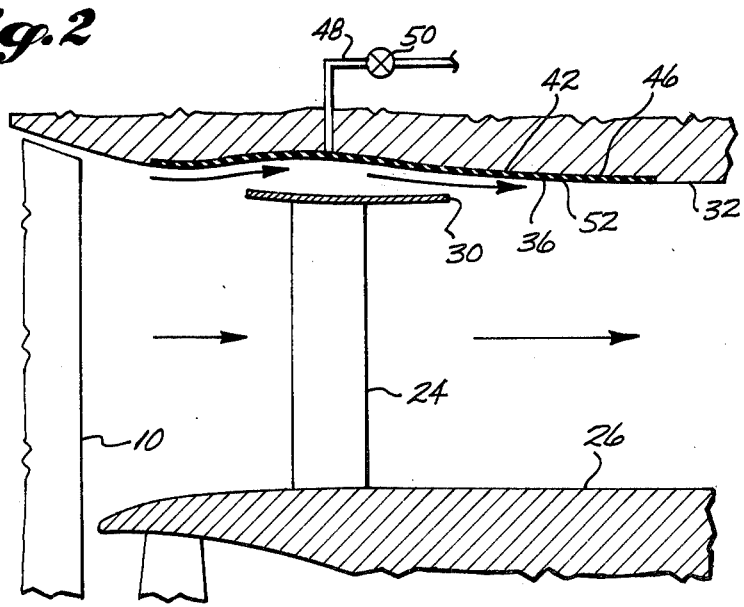
FIG. 3 shows a more detailed view of FIG. 1 in the same region of the flexible membrane in the approach and takeoff position.

In FIG. 3 the membrane is shown as it would be positioned during an approach or takeoff when sound suppression would be desirable. In this situation, the pressure differential between the outer surface 52 and the inner surface 46 of the membrane is adjusted such that the membrane is forced against recess 42. With the membrane in this position an annular passageway is opened in between the membrane and shroud 30 through which the fan tip flow may pass.

Figure 4:
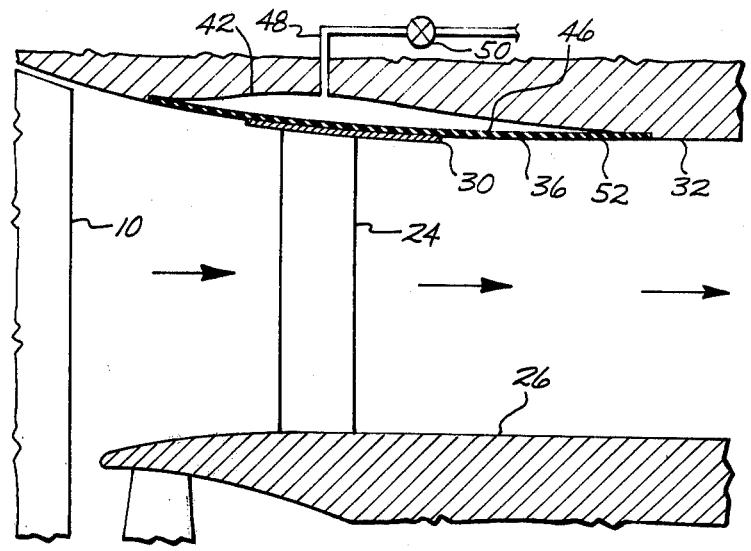
FIG. 4 shows a more detailed view of FIG. 1 in the same region with a flexible membrane in the cruise position.

In FIG. 4 the membrane is shown expanded against shroud 30 which is its normal position for engine cruise. To maintain the membrane in this position it may be necessary to pressurize cavity 44 by supplying high pressure air through line 48. It should be noted that in both cruise and approach configurations of this invention the normally smooth internal contours of the bypass duct are retained.

In designing a turbofan engine according to this invention, certain general considerations should be observed. First, care should be taken to maintain smooth internal contours in the bypass duct under all operating conditions. Abrupt changes in contour may result in flow separation, turbulence, thrust loss and the generation of additional noise. In this regard it should be noted that recess 42 may be eliminated entirely in certain engines and is not considered by the inventors herein to be an essential element of their invention.

Secondly, the amount of flow bypassed around the stator tips should be minimized to reduce thrust loss in the fan section. The dimensions and contours of the bypass channel will vary from one engine to another, but the inventors herein found that a significant reduction in stator noise can be achieved with the bypassing of approximately eight to ten percent of the fan bypass flow.

Thirdly, the fan section must be designed so that the static pressure of the tip bypass flow is equal to that of the flow passing through the stators at the point where the two flows meet downstream of the stators. Unequal pressures would cause an undesirable amount of turbulence along the interface of the two flows and would result in the generation of additional noise. Two basic approaches may be taken to equalize these pressures. In fan sections where a static pressure rise occurs across the stators, the cross sectional areas of the two airstreams may be selected so as to equalize the static pressures. This can be accomplished by sizing the shroud so that the mixing plane is located some distance downstream from the stators. Also, the fan section may be designed so that only rise in pressure in the bypass flow occurs across the rotor and so that the stators have no effect on static pressure. In such case, the shroud encircling the stators may be eliminated.

Finally, although only one specific embodiment of this invention has been illustrated and described, it is to be understood that obvious modifications may be made of it without departing from the true scope and spirit of this invention.

What is claimed is:

1. A gas turbine engine of the type commonly known as a turbofan comprising:
   a core engine;

a centerbody enclosing said core engine and having an outer wall;

a fan rotor located near the forward end of said core engine;

a fan casing having an inner wall enclosing said rotor and forming an annular duct between said inner wall thereof and the outer wall of said centerbody for the passage of air through the engine;

a row of fan stators located downstream of said rotor, attached to said centerbody, and extending radially outward therefrom, each of said stators having a radially outermost tip located radially inward of said inner wall and defining a gap therebetween; and, a flexible membrane circumferentially disposed about the inner wall of said fan casing radially outward said tips of said fan stators and having an inner and outer surface.

2. The engine of claim 1 wherein the inner wall of said fan casing has a contoured recess underlying said membrane for receiving said membrane.

3. The engine of claim 1 further comprising a cylindrical shroud concentrically surrounding said centerbody and attached to the radially outermost tips of said fan stators.

4. The engine of claim 1 wherein said membrane is circumferentially flexible but substantially inflexible in the axial direction.

5. The engine of claim 2 wherein said membrane has a first operating position lying contiguous to said contoured recess and a second operating position in contact with the radially outermost tips of said fan stators.

6. The engine of claim 3 wherein said membrane has a first operating position lying contiguous to said inner wall of said fan casing and a second operating position in contact with said shroud.

7. The engine of claim 1 further comprising fluid pressure means for varying the shape of said membrane and thereby varying the area of said duct.

8. The engine of claim 7 wherein said fluid pressure means comprises means for controllably creating a pressure differential between the inner and outer surfaces of said membrane.

9. The engine of claim 7 wherein said fluid pressure means comprises means for controllably exposing the inner surface of said membrane to atmospheric pressure.

* * * * *